United States Patent Office 2,818,450
Patented Dec. 31, 1957

2,818,450

SPIROHYDRINDENES FOR RESOLUTION OF HYDROCARBON MIXTURES CONTAINING RELATIVELY STRAIGHT CHAIN ALIPHATIC COMPONENTS

Ralph B. Thompson, Hinsdale, and Edward M. Geiser, Downers Grove, Ill., assignors to Universal Oil Products Company, Des Plaines, Ill., a corporation of Delaware No Drawing. Application October 4, 1956
Serial No. 613,805

17 Claims. (Cl. 260—666)

This invention relates to a process for separating hydrocarbon mixtures containing at least one component having a relatively straight chain structure compared to the remaining constituents of the hydrocarbon mixture. More specifically, the present invention concerns a process for segregating relatively straight chain aliphatic hydrocarbons from hydrocarbon mixtures utilizing as a separating agent, a class of materials capable of combining selectively with said relatively straight chain components, said separating agent being herein referred to as a 1,1'-bis-spirohydrindene.

One object of this invention is to separate the relatively straight chain aliphatic components of a hydrocarbon mixture from other components also present in the mixture selected from the group consisting of more highly branched chain aliphatic hydrocarbons and cylic hydrocarbons of naphthenic or aromatic structure.

Another object of the invention, ancillary to the foregoing object, is to appreciate the anti-knock rating of gasoline fractions by concentrating the isoparaffinic and cyclic hydrocarbon components present in the gasoline fraction. In other specific applications of the process, it may be desirable to separate individual paraffins or olefins of specific structure from aromatic hydrocarbons, cycloparaffins or more highly branched chain aliphatic hydrocarbons of specific identity.

In one of its embodiments the present invention concerns a process for separating a mixture of at least two classes of hydrocarbons, one class comprising an aliphatic hydrocarbon of relatively less branched chain structure than other components of said mixture and said other class comprising a component selected from the group consisting of branched chain aliphatic and cyclic hydrocarbons, said process comprising introducing into said mixture a 1,1'-bis-spirohydrindene compound characterized in having a polar radical substituted on the spirohydrindene nucleus in the 6,6'-position and in having an alkyl radical substituted on the nucleus in the 3,3'-positions and thereafter separating from the resulting spirohydrindene-hydrocarbon mixture a fraction enriched with respect to said other class of hydrocarbon.

In accordance with one of its more specific embodiments this invention concerns a method for separating aliphatic paraffins containing at least 4 carbon atoms from a mixture thereof with branched chain paraffins and cyclic hydrocarbons which comprises subjecting said mixture to countercurrent adsorptive contact with a 1,1'-bis-spirohydrindene having a polar substituent in the 5,5' and 6,6'-positions and an alkyl radical containing from 1 to 12 carbon atoms in the 3,3'-positions, and recovering from a resulting spirohydrindene complex a raffinate fraction comprising at least one of the aforementioned branched chain and cyclic hydrocarbons in a proportion greater than the proportion of said last mentioned hydrocarbons in said mixture.

Generally speaking, the process of this invention provides a means for separating mixtures of hydrocarbons differing in structure, that is, differing in the arrangement of carbon atoms in the molecular chain, and is particularly directed to a method for effecting a separation between aliphatic hydrocarbons having relatively straight chain configuration from hydrocarbons of more highly branched chain or of cyclic structure. The effectiveness of the present separating agents for resolving a mixture of hydrocarbons into a fraction comprising predominantly relatively straight chain hydrocarbons and a fraction comprising hydrocarbons of more branched chain or cyclic structure depends upon the ability of certain spirohydrindenes of specific structure, as hereinafter specified to combine with the normal or relatively straight chain aliphatic components of the hydrocarbon mixture contacted therewith. This selective ability to combine with the relatively straight chain components of the feed stock is distinguished from its equally selective rejection of isoparaffinic and iso-olefinic hydrocarbons of aliphatic or cyclic structure as well as its rejection of hydrocarbons of aromatic structure. In thus advancing a possible explanation of the unique ability of the present 1,1'-bis-spirohydrindene compound for separating hydrocarbon mixtures, it is not intended to thereby necessarily limit the scope of the present invention in accordance with the limits thus impressed on the process by the proposed theory of its operation.

The present separating agents which may be utilized in adsorption-type separation procedures or as an additive to hydrocarbon mixtures for the purpose of depressing the vapor pressure of the normal or relatively straight chain hydrocarbon components of a mixture of hydrocarbons containing the same in an extractive distillation type of separation are members of a class of compounds referred to as 1,1'-bis-spirohydrindenes which have a specific structure corresponding in general to the following formula:

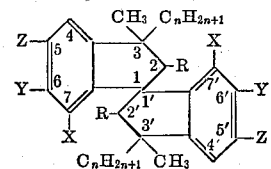

wherein $n$ is a whole number having a value of from 1 to 12, R is selected from the group consisting of hydrogen and alkyl containing from 1 to 12 carbon atoms, X, Y, and Z are selected from the group consisting of hydrogen and a polar radical, hereinafter identified, at least one of said X and Y substituents being a polar radical. The spirohydrindene containing the indicated nuclear substituents in its structure acts somewhat in the capacity of a molecular sieve in that the relatively straight chain aliphatic hydrocarbon retained by the separating agent is retained by virtue of adsorptive or complex-forming forces while the hydrocarbon components of the mixture having a branched chain or cyclic structure pass around the spirohydrindene and remain unadsorbed. The net result of contacting the present spirohydrindene separating agent with the hydrocarbon feed stock comprising relatively straight chain and branched chain or cyclic hydrocarbons is the retention in the separating agent of the relatively straight chain aliphatic components, while in a distillation type of separation, the spirohydrindene tends to increase the boiling point of the straight chain aliphatic components, permitting the branched chain and cyclic hydrocarbons to boil and distill over at their normal boiling points. The overhead from such a distillation, therefore, is enriched with respect to the branched chain and/or cyclic components of the mixed feed stock, while the still residue is enriched with the straight chain or relatively straight chain aliphatic components of the feed stock.

Although the preferred spirohydrindene compounds of the above structure contain an alkyl group in the 2,2'-positions as well as one or two alkyl radicals in the 3,3'-positions of straight chain configuration, the above indicated substituents are not necessarily essential to the effectiveness of the present spirohydrindene compounds for their indicated purposes, except that at least one alkyl group must be present in each of the 3,3'-positions. Of the straight chain alkyl radicals in the 3,3'-positions, alkyl groups containing at least 4, up to about 7, carbon atoms are further preferred and provide separating agents having a maximum degree of effectiveness in the present separating process. The additional substituent which may be present in the 3,3'-position, as well as the alkyl group alternatively substituted in the 2,2'-position, may contain the same number of carbon atoms and may be of the same configuration as the essential alkyl group in the 3,3'-position, but need not necessarily be so characterized, the preferred spirohydrindene separating agents being the compounds in which the substituent in the 2,2'-position is hydrogen or an alkyl group of no greater chain length than the ethyl radical.

The polar radical substituted in at least the 6 and 6'-position on the spirohydrindene nucleus and which may additionally be substituted in the 5,5'- and 7,7'-positions may be selected from one or more members of a relatively large number of monovalent radicals having polar characteristics, including, for example, hydroxyl, carboxyl, cyano, nitro, amino, sulfo, sulfhydryl, etc., one of the preferred polar radicals for this purpose being the hydroxyl group. Compounds containing the indicated polar radicals in the indicated 6,6'-positions and which also contain an additional polar radical substituted in at least the 5,5'- and preferably also in the 7,7'-positions, such as an hydroxyl group (in addition, that is, to the polar radical in the 6 and 6'-positions of the spirohydrindene nucleus), are preferred herein since they exhibit substantially greater effectiveness for the present type of separation process than compounds in which polar radicals are not present in the 5,5' and 7, and 7' positions. The additional substituents in the latter positions may be the same as or different than the polar radical in the 6 and 6'-positions.

Suitable hydrocarbon feed stock mixtures utilizable in the present separation process include hydrocarbon mixtures containing from small amounts to large amounts of normal or relatively straight chain aliphatic hydrocarbons, the remaining component or components of the mixture being any one or more members of the group comprising the aliphatic hydrocarbons of more highly branched chain structure than the components to be separated, naphthenic hydrocarbons and aromatic hydrocarbons of mono or bicyclic ring structure, the feed stock components in general being limited to mixtures in which individual constituents contain at least about 4 carbon atoms per molecule. A particularly useful application of the present separation process is for the treatment of gasoline boiling range fractions for the purpose of increasing the octane number thereof by removing the relatively straight chain aliphatic hydrocarbon components which have the lowest octane rating of the various types of hydrocarbons and reduce the octane rating of gasoline boiling range fractions in which they occur. Thus, by subjecting a mixture of hydrocarbons boiling in the gasoline range to treatment with the present separating agent, the effluent or raffinate from the process contains a relatively greater proportion of hydrocarbon types of higher octane rating than the feed stock mixture because of the selective removal of normal or relatively straight chain aliphatic components from the fraction thus subjected to such treatment. The hydrocarbons removed from the gasoline fraction by the separating agent may be individually recovered and further subjected to a refining process, such as an isomerization or a reforming process capable of converting the recovered, relatively straight chain hydrocarbons into branched chain or cyclic isomers of higher octane rating.

In the application of the present process to a separation problem for recovering or removing normal or relatively straight chain aliphatic components from a mixture of hydrocarbons, the feed stock may be passed through a bed of or mixed with particles of the spirohydrindene separating agent, or the latter may be added to a distillation column in which the feed stock is being fractionated in an extractive distillation type of operation. A convenient method of operating a contacting type of separation process involving the present spirohydrindene separating agent comprises mixing the hydrocarbon feed stock in liquid phase with the separating agent which normally exists in the form of a solid having a relatively high melting point, charging the separating agent into the contacting vessel in the form of discrete particles and after thoroughly mixing the separating agent with the feed stock, filtering the resulting slurry to recover the separating agent having adsorbed or occluded thereon the normal or relatively straight chain aliphatic hydrocarbon components of the feed stock. In view of the insolubility of the present spirohydrindene separating agents in the hydrocarbon feed stock, another method of operating a separation process involving the present spirohydrindenes comprises passing the hydrocarbon feed stock mixture through a vertical column loosely packed with discrete particles of the spirohydrindene until the solid separating agent has substantially saturated its capacity to adsorb additional hydrocarbon. In this type of operation, the spirohydrindene may also be composited with or deposited on a suitable solid supporting material, such as charcoal, sand, quartz chips, firebrick or other solid material of generally porous structure insoluble in the hydrocarbon stream. The mixed hydrocarbon feed stock may be charged into either the upper or lower portion of a vertical column packed with the separating agent to provide either downward or upward flow respectively. The adsorption type of contacting procedure may be effected in either liquid-solid or gas-solid mixed phase condition, depending upon the temperature of the feed stock and the ambient pressure maintained in the adsorption column. In either method of contact the temperature of the operation must be such that the spirohydrindene is maintained in contact with the gaseous or liquid feed stock in substantially solid phase; that is, at a temperature below the melting point of the normally solid spirohydrindene. When employing a gas-solid phase type of separation procedure, the feed stock in gaseous phase may be introduced into the contacting column while the spirohydrindene is maintained as a stationary, packed bed (giving rise to the so-called "fixed bed" technique) or the velocity of the gaseous feed stock may be sufficient to continuously suspend the solid spirohydrindene in the gaseous phase, giving rise to the so-called "fluidized bed" separation technique.

One of the preferred methods of separation utilizing the present spirohydrindene compounds comprises mixing the spirohydrindene with a hydrocarbon feed stock and subjecting the resultant mixture to extractive distillation under conditions whereby the branched chain and/or cyclic components of the feed stock, the boiling points of which are uneffected by the presence of the spirohydrindene, are distilled overhead from the resulting mixture in the distillation column, while the normal or relatively straight chain aliphatic components of the feed stock, the vapor pressures of which are depressed by combining with the spirohydrindene, are retained within the column as a higher boiling residue. Still another method of separation which provides an effective means of separation comprises mixing the hydrocarbon feed stock with an aqueous slurry of the spirohydrindene in finely divided condition and thereafter allowing phase separation to take place, the normal or relatively straight chain components of the feed stock combining with the spirohydrindene while the relatively branched chain or cyclic hydrocarbon components of the feed stock form a separate phase which may be decanted, steam distilled, centrifuged or filtered from the solid phase comprising the spirohydrindene-straight chain hydrocarbon complex. Instead of water as the suspending medium, a hydrocarbon conveniently having a boiling point above or below the feed stock mixture, may be utilized as suspending medium, the nonadsorbed branched chain or cyclic hydrocarbon components of the feed stock thereby mixing with the excess hydrocarbon suspending medium to form a raffinate phase which may be distilled or otherwise separated from the nonadsorbed hydrocarbon components of the feed stock. The preferred hydrocarbons for this purpose are the cyclic and branched chain hydrocarbons of lower molecular weight than the hydrocarbon components of the feed stock, represented, for example, by isobutane, isopentane, 2,3-dimethylbutane, cyclopentane, cyclohexane, or other lower molecular weight hydrocarbon of the class not adsorbed by the present spirohydrindene separating agent.

If desired, the relatively straight chain aliphatic hydrocarbon adsorbed by the spirohydrindene may be recovered therefrom, and for this purpose the solid complex or adduct formed during the contacting procedure may be heated above the boiling point of the adsorbed hydrocarbon to distill the same from the complex or adduct, preferably under reduced pressure, in order to increase the quantity and rate of hydrocarbon recovered from the complex. Another suitable method for recovering the adsorbed hydrocarbon comprises washing the complex with an excess of a liquid or gaseous hydrocarbon stream comprising hydrocarbons which act as desorbing agents and for this purpose, a hydrocarbon which is preferentially adsorbed by the spirohydrindene, and which may be subsequently separated from the resulting desorbed hydrocarbon of the feed stock mixture, such as n-pentane, n-hexane, n-heptane, etc., may be contacted with the spent complex to effect the desorption. The effluent stream may thereafter be distilled to recover the desorbed hydrocarbon from the desorbing wash hydrocarbon, if desired. The washing or desorption step is also preferably effected under countercurrent flow conditions in order to thereby increase the extent and rate of recovery of the adsorbed feed stock hydrocarbon from the spent adsorbent. The spirohydrindene thus contacted with a desorbing agent may generally be readily regenerated by heating, steaming, or by other methods well-known to the prior art for restoring the adsorbency of the spirohydrindene for further use in a succeeding run.

The separation process herein provided is effected at temperatures below the melting point of the spirohydrindene adsorbent, preferably at temperatures below about 120° C. and at pressures sufficient to maintain the hydrocarbon feed stock in substantially liquid phase, if a liquid phase type of operation is desired. The separating agent to feed stock ratio charged to the separation column is preferably sufficient to provide at least 0.1 mole of spirohydrindene per mole of the hydrocarbon component in the feed stock mixture to be separated; that is, sufficient to provide a molar ratio of spirohydrindene to the normal or relatively straight chain component of the feed stock of at least 0.1 to 1 to about 10 to 1 and preferably from about 0.5 to 1 to about 3 to 1 moles of spirohydrindene per mole of hydrocarbon component of the feed stock to be adsorbed thereby.

The present separation process may be effected in a batch type procedure or on a continuous basis and in a typical batch type operation the spirohydrindene and feed stock mixture are charged into a suitably stirred vessel wherein the resulting mixture is stirred or otherwise agitated for a period of from about ½ to about 2 hours, followed by separating the spirohydrindene-adsorbed hydrocarbon complex, for example, by centrifuging, filtration or by other suitable methods of separation. In a typical continuous type of operation, the feed stock mixture and spirohydrindene adsorbent are continuously charged into a suitable vessel, the spirohydrindene preferably being introduced into one end of the vessel (the end of the vessel from which the raffinate stream of unadsorbed feed stock hydrocarbon components are withdrawn) at the same time that the spirohydrindene-adsorbed hydrocarbon complex is withdrawn from the other end of the vessel into which the feed stock is generally charged. A preferred type of vessel for this purpose is a vertical column which is relatively elongated compared to its width or diameter, thereby providing an apparatus suitable for effecting true countercurrent flow between the solid and fluid phases.

In a continuous type of operation as described above, the desorbing agent which may be a preferentially adsorbed hydrocarbon of straight chain structure or an inert hydrocarbon or other gaseous stream, such as nitrogen, carbon monoxide, steam, carbon dioxide, preferably at a sufficiently elevated temperature to vaporize the adsorbed hydrocarbon from the complex but sufficiently below the melting point of either the complex or the spirohydrindene adsorbent to prevent liquefaction or agglomeration of the solid adsorbent or complex, is charged into a vessel, such as an elongated vertical column, preferably in countercurrent flow relationship to the spent adsorbent charged into the opposite end of the vessel to thereby recover the adsorbed hydrocarbon component of the feed stock. Depending upon the temperature of the desorption operation, the adsorbed hydrocarbon is removed with the desorbing agent in vapor or liquid state from the effluent end of the desorption column.

This invention is further described with respect to certain specific embodiments thereof in the following examples, which, however, are not intended to limit the scope of the invention necessarily in accordance therewith.

*Example 1*

In a chromatographic adsorption type of separation procedure, the apparatus utilized was a glass tube 10 inches x 7 mm. i. d., having an inlet at the top and a liquid outlet from the bottom of the tube, said tube being packed to 8 inches of its length with a crystalline solid consisting of purified 5,6,5',6'-tetrahydroxy-3,3'-di-n-hexyl-3,3'-dimethyl-bis-1,1'-spirohydrindene. Into the top of the tube was charged a mixture of pure n-heptane and iso-octane containing equal weights of each, the liquid mixture being charged into the top of the column dropwise and fractions, each representing 10% by weight of the total charge stock, were removed from the outlet at the bottom of the column. The column and the mixture were maintained at approximately room temperature. The first fraction removed from the column was subjected to infra-red spectrographic analysis and found to contain 67% by weight of iso-octane and 33% by weight of n-heptane. A second fraction, representing the next 10% by weight of the charge stock, was separately collected from the outlet and it too was subjected to infra-red spectrographic analysis, the mixture containing 52% iso-octane and 48% n-heptane.

The same spirohydrindene derivative that was utilized in the preceding experiment was employed in an extractive distillation type separation and for this purpose, a 50–50 parts by weight mixture of n-heptane and iso-octane was mixed with 60% by weight of the hydrocarbon charge of the above indicated spirohydrindene compound and the latter mixture distilled at atmospheric pressure, overhead fractions, each representing successive 5% by weight portions of the hydrocarbon charge, being collected in the receiver attached to the overhead condenser. The first fraction contained 76% iso-octane and 24% n-heptane by spectrographic analysis thereof.

The second 5% fraction contained 72% iso-octane and 28% n-heptane. The third 5% fraction contained 58% iso-octane and 42% n-heptane.

Example II

In a chromatographic adsorption type of separation procedure similar to the experiment of Example I, above, except that the spirohydrindene derivative utilized as adsorbent was the compound: 5,6,5',6'-tetrahydroxy-3,3,3',3'-tetramethyl-bis-1,1'-spirohydrindene, the first 10% effluent fraction drained from the outlet at the bottom of the column contained 51% iso-octane and 49% by weight of n-heptane. Succeeding fractions were not taken in view of the relatively slight separation realized.

In the same apparatus, and utilizing the same charging stock, except that the spirohydrindene derivative utilized as adsorbent was the compound: 5,6,5',6'-tetrahydroxy-2,3,3'-trimethyl-3,3'-diethyl-bis-1,1'-spirohydrindene, the first fraction, representing 10% by weight of the charge stock recovered as effluent from the bottom of the column, contained 52% by weight of iso-octane and 48% by weight of n-heptane, these results indicating that the substitution of ethyl radicals in place of two of the methyl radicals on the 3 and 3' positions resulted in only slightly better separation than the methyl-substituted derivatives.

In the following run the same apparatus that was employed in the preceding run and a similar spirohydrindene compound was utilized as the separating agent, except that the hydroxyl groups in the 5,5'-position were methylated; that is, 6,6'-dihydroxy - 5,5' - dimethoxy - 3,3,3',3' - tetramethyl-bis-1,1'-spirohydrindene was utilized as separating agent. The first 10% fraction contained the same proportion of iso-octane and n-heptane as the charge stock; hence, no separation was realized.

In still another experiment utilizing a similar spirohydrindene except that the hydroxyl groups in the 5,5'- and 6,6'-positions were acetylated, no separation occurred.

In the same apparatus and utilizing the same charging stock except that the spirohydrindene derivative employed as separating agent was 4,5,6,4',5',6'-hexahydroxy-3,3,3',3'-tetramethyl-bis-1,1'-spirohydrindene (that is, the preceding compound with an additional hydroxyl group in the 4 and 4'-positions), the first 10% fraction of effluent indicated that the derivative was effective for separation, 54% of the first fraction being iso-octane and 46% being n-heptane.

The above spirohydrindene, that is, 4,5,6,4',5',6'-hexahydroxy - 3,3,3',3' - tetramethyl-bis-1,1'-spirohydrindene, when charged into an extractive distillation column in an amount representing 40% by weight of the hydrocarbon charge stock (consisting of a 50-50 weight percent mixture of n-heptane and iso-octane and the mixture thereafter distilled was an effective separating agent for this type of separation procedure, the first 10% by weight of the charge distilled overhead containing 55.4% iso-octane and 44.6% n-heptane (as indicated by spectographic analysis of the fraction).

Utilizing the same charging stock and the same chromatographic adsorption apparatus, except that the column was packed with a spirohydrindene in which the n-hexyl radical is substituted in the 3,3'-position and a methyl group is also present in the 3,3'-positions, with hydroxyl radicals in the 5,6,5',6'-positions, the first 10% fraction recovered from the column into which a 50-50 weight percent mixture of iso-octane and n-heptane was charged contained 69.5% iso-octane and 31.5% n-heptane.

Example III

Utilizing the same spirohydrindene derivative as specified in the next preceding experiment (that is, wherein the 3,3'-positions are substituted by n-hexyl as well as methyl radicals and the 5,6, and 5',6'-positions are substituted by hydroxyl groups) and utilizing a charge stock consisting of 50% by weight of cyclohexane and 50% by weight of n-hexane in an extractive distillation type of separation procedure, charging sufficient of the spirohydrindene derivative to constitute 40% by weight of the hydrocarbon charging stock, the first 5% of overhead distillate contains 78% cyclohexane and 22% by weight n-hexane. The second 5% fraction contains 72% cyclohexane and 28% n-hexane. The third 5% fraction contains 62% cyclohexane and 38% n-hexane.

In the same procedure and utilizing the same spirohydrindene derivative as specified above, except that the charging stock consisted of a 50–50 weight percent mixture of benzene and n-hexane, the degree of separation realized was of approximately the same order of magnitude as in the preceding run wherein the charging stock was a mixture of cyclohexane and n-hexane.

We claim as our invention:

1. A process for separating a mixture of at least two classes of hydrocarbons, one class of which comprises an aliphatic hydrocarbon of relatively less branched chain structure than the other components of said mixture and said other class is selected from the group consisting of branched chain aliphatic and cyclic hydrocarbons, said process comprising introducing into said mixture a 1,1'-bis-spirohydrindene compound characterized in having a polar radical substituted on the spirohydrindene nucleus in the 6,6'-position and in having an alkyl radical substituted on said nucleus in the 3,3'-position and thereafter separating from the resulting spirohydrindene-hydrocarbon mixture a fraction enriched with respect to said other class of hydrocarbon.

2. The process of claim 1 further characterized in that said cyclic hydrocarbon is a naphthene.

3. The process of claim 1 further characterized in that said cyclic hydrocarbon is an aromatic hydrocarbon.

4. The process of claim 1 further characterized in that said aliphatic hydrocarbon of less branched chain structure is a normal, straight chain hydrocarbon.

5. The process of claim 1 further characterized in that said hydrocarbon mixture comprises hydrocarbons containing from 5 to about 20 carbon atoms per molecule.

6. The process of claim 1 further characterized in that said alkyl radical contains at least 5 carbon atoms.

7. The process of claim 6 further characterized in that said alkyl radical contains not more than about 12 carbon atoms.

8. The process of claim 1 further characterized in that said polar radical is an hydroxyl group.

9. The process of claim 1 further characterized in that said 1,1'-bis-spirohydrindene contains additional polar radicals in the 5,5'-positions.

10. The process of claim 1 further characterized in that said 1,1'-bis-spirohydrindene contains an additional polar radical in the 4,4'-positions.

11. The process of claim 1 further characterized in that said 1,1'-bis-spirohydrindene comprises 5,6,5',6'-tetrahydroxy - 2,3,3' - trimethyl - 3,3' - diethyl - bis - 1,1'-spirohydrindene.

12. The process of claim 1 further characterized in that said 1,1'-bis-spirohydrindene comprises 4,5,6,4',5',6'-hexahydroxy-3,3,3',3'-tetramethyl-bis-1,1'-spirohydrindene.

13. The process of claim 1 further characterized in that said 1,1'-bis-spirohydrindene comprises 5,6,5',6'-tetrahydroxy - 3,3' - di-n-hexyl - 3,3' - dimethyl - bis - 1,1'-spirohydrindene.

14. A method for separating aliphatic paraffins containing at least 4 carbon atoms from a mixture thereof with branched chain paraffins and cyclic hydrocarbons which comprises subjecting said mixture to countercurrent adsorptive contact with a 1,1'-bis-spirohydrindene having a polar substituent in the 5,5'- and 6,6'-positions and an alkyl radical containing from 1 to 12 carbon atoms in the 3,3'-positions, and recovering from the resulting spirohydrindene complex a raffinate fraction comprising at least one of the aforementioned branched chain and cyclic hydrocarbons in a proportion greater than the proportion of said last mentioned hydrocarbon in said mixture.

15. The process of claim 14 further characterized in that said polar substituent is an hydroxyl group.

16. A method for separating aliphatic paraffins containing at least 4 carbon atoms from a mixture thereof with branched chain paraffins and cyclic hydrocarbons which comprises distilling said mixture containing, in addition to said hydrocarbons, a 1,1'-bis-spirohydrindene having a polar substituent in the 5,5'- and 6,6'-positions and an alkyl radical containing from 1 to 12 carbon atoms in the 3,3'-positions, and recovering an overhead distillate fraction comprising at least one of the aforementioned branched chain and cyclic hydrocarbons in a proportion greater than the proportion of said last mentioned hydrocarbons in said mixture.

17. The process of claim 16 further characterized in that said polar substituent is an hydroxyl group.

References Cited in the file of this patent

UNITED STATES PATENTS

| | | |
|---|---|---|
| 2,176,881 | Burroughs | Oct. 24, 1939 |
| 2,176,883 | Fisher | Oct. 24, 1939 |

FOREIGN PATENTS

| | | |
|---|---|---|
| 548,905 | Great Britain | Oct. 29, 1942 |